INVENTOR.
Joseph R. Metz

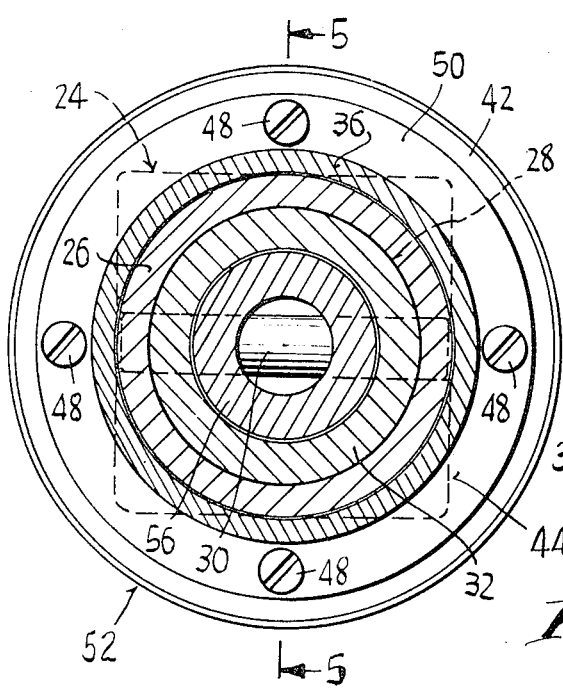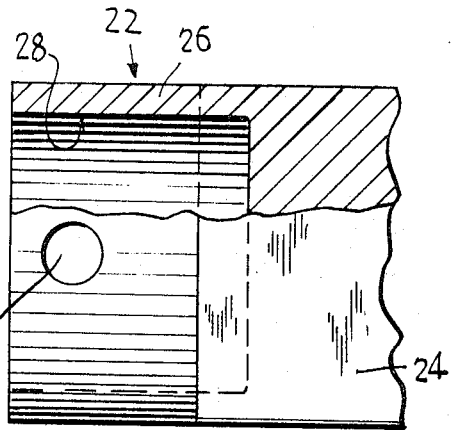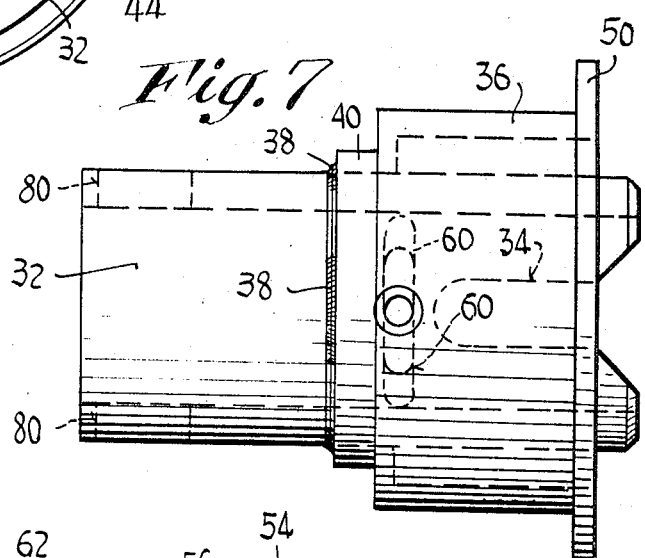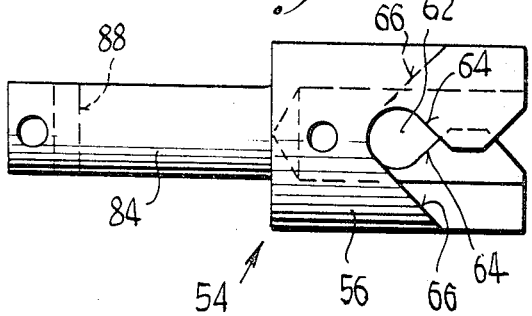
INVENTOR.
Joseph R. Metz

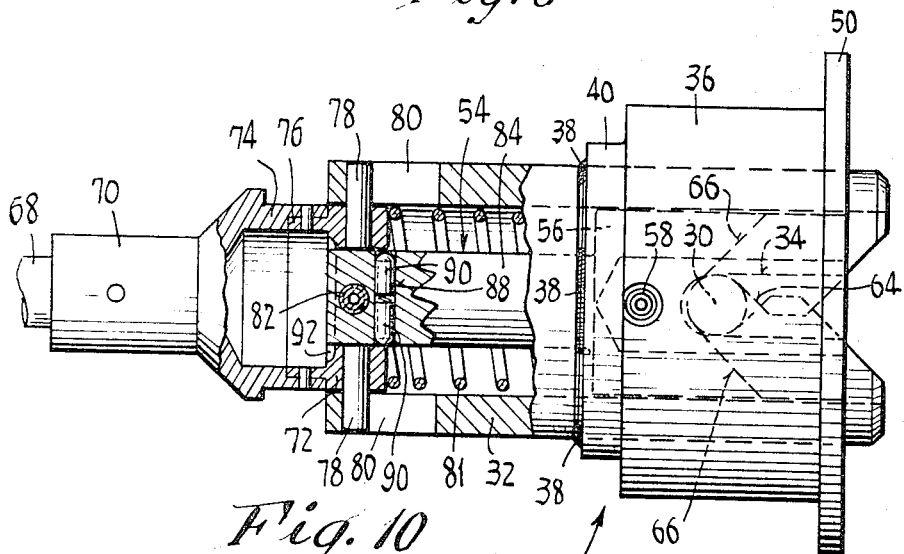
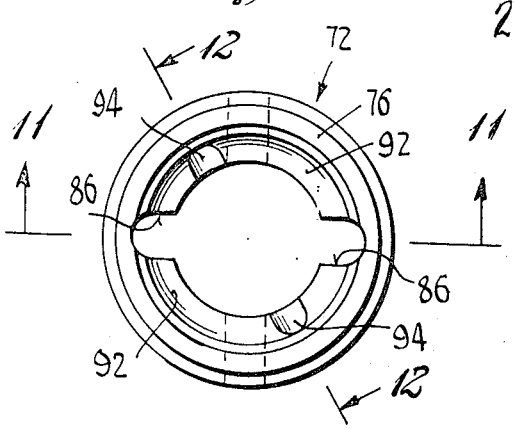
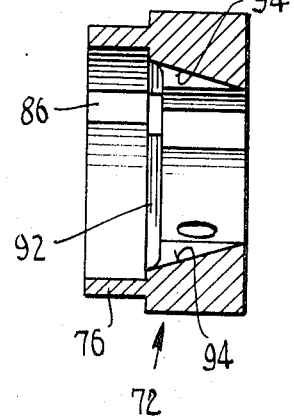
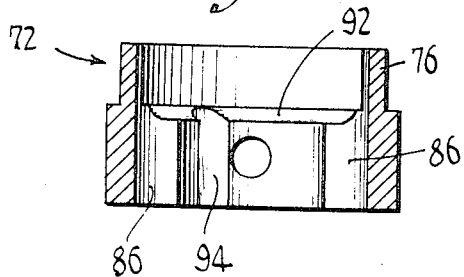

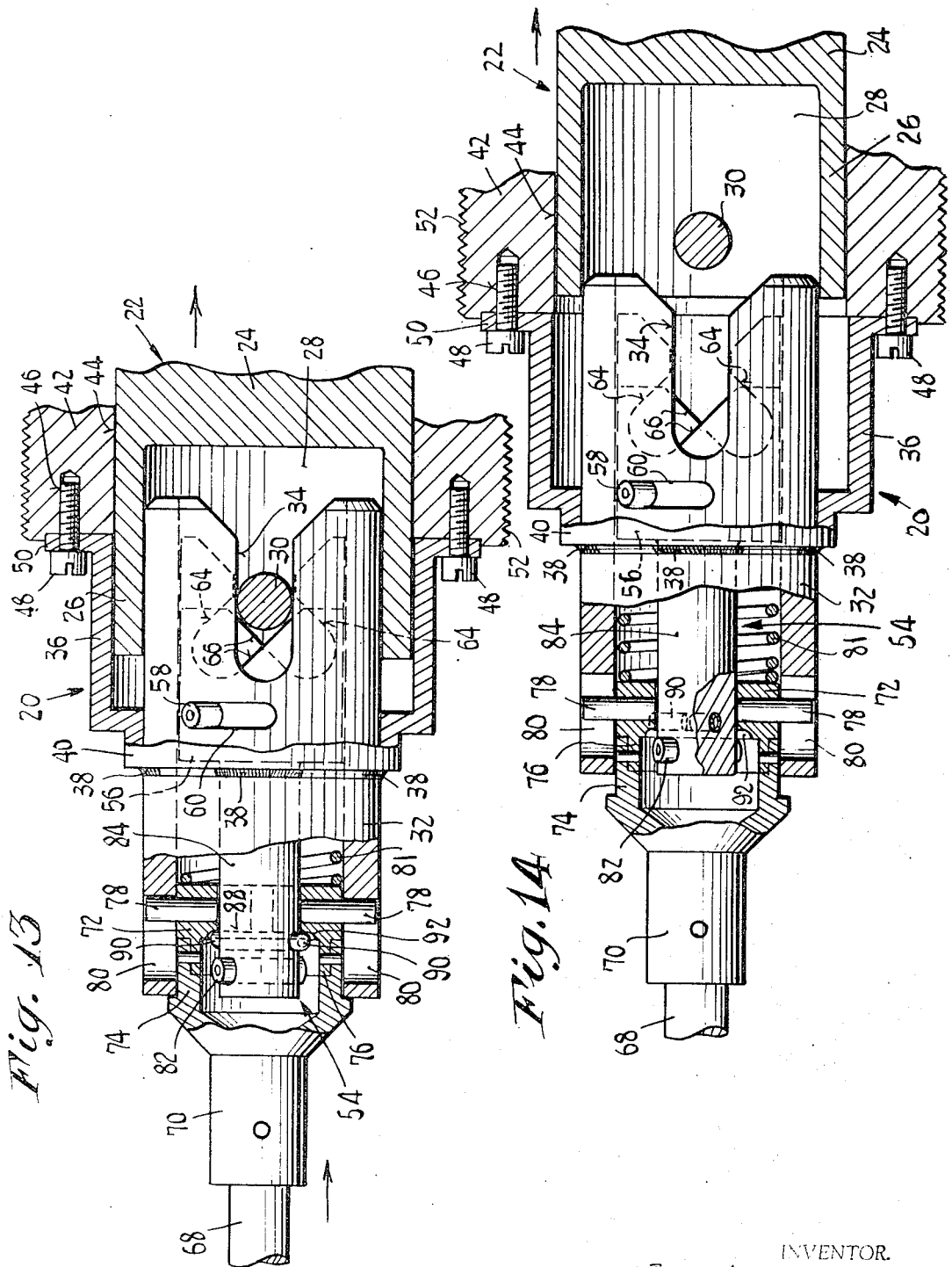

---
United States Patent Office 3,452,404
Patented July 1, 1969

---

3,452,404
PUSH-TO-RELEASE COUPLING
Joseph R. Metz, Ridgefield, Conn., assignor to Norco Inc., Ridgefield, Conn., a corporation of Connecticut
Filed Sept. 28, 1967, Ser. No. 671,357
Int. Cl. A44b *19/00, 17/00*
U.S. Cl. 24—230                                              13 Claims

ABSTRACT OF THE DISCLOSURE

A releasable coupling one part of which has a cross bar that is gripped by jaws on the other part. The jaws are formed on the other part by slotted juxtaposed ends of two tubular telescoped members which can have relative turning movement. A captive control ring is axially movable on one member between locking and releasing positions, and is keyed thereto against turning. The control ring and the other member have interfitting separable coupling means by which they can be keyed against turning or released for relative turning. The ring by its positioning thus controls the turning of the telescoped members, to control the cooperable jaws.

Cross references to related applications (1) Copending application of John J. McCarthy, Ser. No. 390,617, filed Aug. 19, 1964, entitled "Releasable Mechanical Coupling," and having common ownership with the present application.

(2) Copending application of John J. McCarthy, Ser. No. 542,938, filed Apr. 15, 1966, entitled "Concentric Tube Releasable Class," and having common ownership with the present application.

(3) Copending application of John J. McCarthy, Ser. No. 618,722, filed Feb. 27, 1967, entitled "Quickly Openable Snatch Block," and having common ownership with the present application.

(4) Copending application of John J. McCarthy, Ser. No. 645,731, filed June 13, 1967, entitled "Separable Fastener Receiver Part," and having common ownership with the present application.

(5) Copending application of Joseph R. Metz, Ser. No. 652,917, filed July 12, 1967, entitled "Locking Type Quick-Release Fastener," and having common ownership with the present application.

(6) Copending application of Joseph R. Metz, Ser. No. 660,415, filed Aug. 14, 1967, entitled "Adjustable Locking Type Quick-Release Fastener," and having common ownership with the present application.

Background

This invention relates to quick-release couplings wherein a member of one coupling part is releasably gripped by jaw-like formations of a cooperable coupling part.

Heretofore numerous releasable couplings have been proposed and produced. None, so far as I am aware, can be adapted satisfactorily to effect, in a relatively small space, a release of the two coupling parts by a pushing force exerted on one part in the direction of the other part, with the one part remaining cocked after such release, in instant readiness to again be attached to the other part. In certain special situations such action is of considerable value.

Summary

The above drawbacks of prior two-part couplings are obviated by the present invention, and one object of the invention is to provide a novel and improved, small and compact two-part quick-release separable fastener or coupling, wherein the release is effected by pushing force exerted on a release member of one part in a direction toward the other part, said one part retaining a cocked condition whereby it is instantly ready, after such release, to be rejoined by or reattached to its cooperable part.

This is accomplished by providing, for cooperation with a cross bar of the cooperable part, a pair of relatively turnable telescoped members having cooperable jaw formations at their corresponding forward ends, which can grip or release the cross bar depending on the relative rotative positions of the members. The telescoped members can be locked in the jaw gripping positions by a captive release ring which is keyed to one member against turning but is axially movable between releasing and locking positions. When the ring is in the locking position, cooperable means on the ring and other member couple the members against turning, with the jaws closed. Shifting the ring to the releasing position uncouples the members whereby they can be relatively turned, to open the jaws for release of the cross bar. The releasing movement of the ring is in a direction toward the cooperable coupling part. The ring when shifted to effect release, yieldably holds the telescoped members in the positions separating the jaws, whereby the jaw-carrying coupling part is cocked and always in readiness for recoupling to its cooperable part.

Other features and objects of the invention involve the provision of an improved two-part coupling as above set forth, which is strong and rugged, reliable in operation whereby malfunctioning is averted, substantially fully enclosed, quick in action, small and compact, and relatively economical to produce.

Still other features and advantages will hereinafter appear.

In the drawings:

FIG. 4 is a tranverse sectional view taken on the line 4—4 of FIG. 1.

FIG. 5 is a view of the trunnion part included in FIG. 4, being partly in side elevation and partly in axial section, the section being taken on line 5—5 of FIG. 4.

FIG. 6 is a view partly in axial section and partly in side elevation of the lock-assembly part of the coupling, but with an adaptor member or ring removed.

FIG. 7 is a side elevational view of the body portion of the lock assembly.

FIG. 8 is a side elevational view of a locking member included in the lock assembly.

FIG. 9 is an end elevational view of the locking member of FIG. 8.

FIG. 10 is a rear elevational view of a release ring included in the lock assembly.

FIG. 11 is a section of the release ring, taken on the line 11—11 of FIG. 10.

FIG. 12 is a section of the release ring of FIG. 10, taken on the line 12—12 thereof.

FIG. 13 is a view partly in axial section and partly in side elevation, similar to that of FIG. 6 but showing the position of the parts when the coupling is being released.

FIG. 14 is a view similar to that of FIG. 13 but showing a subsequent position of the parts of the coupling when released.

Figure 1:
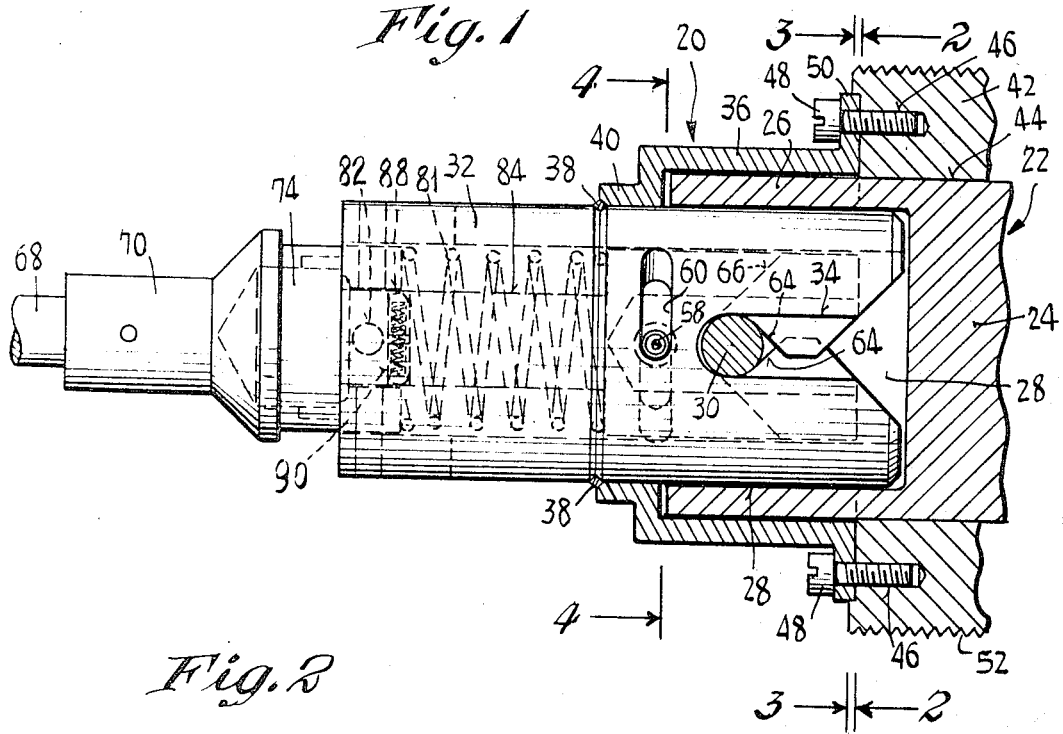
FIG. 1 is a view partly in side elevation and partly in axial section, of the present improved coupling showing the separable parts in their assembled relation.

In FIG. 1 the present improved releasable coupling is shown as comprising a lock-assembly part 20 and a cooperable trunnion part 22 to which the assembly part 20 is releasably attached. The trunnion part 22 comprises a square-section bar 24 having at its end portion 26 a circular bore 28 in which there is disposed a diametric cross pin 30 having ends that pass into the opposite walls of the portion 26.

The bore 28 is adapted to slidably receive an inner body member 32 of the lock assembly 20, said body member being tubular and having a pair of oppositely disposed longitudinally extending open-ended slots 34 (arranged parallel to the axis of the member), which are adapted to receive the cross pin 30 as shown. The lock assembly 20 further comprises an outer tubular body member 36 surrounding the front portion of the inner body member 32 in spaced relation therewith and having a close-fitting smaller diameter portion 40 which is secured to the inner body member by welds 38.

The end portion 26 of the trunnion 24, which has the bore 28, is adapted to be slidably received in an annular space between the inner and outer body members 32, 36, as will be understood.

In accordance with the invention it is possible conveniently to facilitate the orientation or alignment of the cross pin 30 of the trunnion 22 with the slots 34 of the lock assembly when the coupling is being assembled. Also, at the same time the coupling elements are relieved of twisting strains, thereby facilitating separation of the coupling parts. In accomplishing this there is provided an annular trunnion adaptor 42 having a square opening or bore 44 which is adapted to closely slidably fit and receive the square cross section of the trunnion 24. The adaptor 42 comprises a face portion which is provided with threaded holes 46 receiving screws 48 passing through an end flange 50 of the outer lock body 36 whereby the adapter is rigidly secured to the body in a fixed position. Where the adapter 42 is made to have a sufficient length, the square bore 44 thereof can engage the square section of the trunnion bar 24 prior to the cross pin 30 coming upon the inner body 32. By such arrangement a proper orientation or alignment of the pin 30 with the slots 34 can be effected.

When the coupling parts 20, 22 are assembled as illustrated in FIG. 1, the interfitting relation effected by the square shape of the bar 24 and the square bore 44 of the adaptor 42 will relieve strain on the cross pin 30 and cooperable elements, which strain might otherwise occur if relative twisting forces existed between the lock assembly 20 and the trunnion 22 and were not thus assumed. Thus, the provision of the square bore 44 and the matching square cross section of the trunnion insures freedom of the cross pin from binding, and insures a quick and reliable release of the coupling when this is desired.

The trunnion adaptor 42 is provided with external screw threads 52 to enable it to be screwed or mounted in a cooperable supporting member (not shown).

For the purpose of releasably fastening the lock-assembly 20 and specifically the inner body member 32 thereof to the cross pin 30 there is provided a turnable locking member 54 having a slotted end or head portion 56 which closely slidably fits in the bore of the inner body 32. The head portion 56 is hollow or tubular in configuration, and fixedly carries a cross pin 58 the ends of which are received in a pair of oppositely disposed short circumferentially extending slots 60 (only one of which is visible) provided in the inner body 32. By such organization the locking member 54 is prevented from moving longitudinally or axially with respect to the body 32 and has a limited extent of turning movement in the body, as permitted by the travel of the pin 58 in the slots 60.

The head portion 56 of the locking member 54 has a pair of oppositely located diagonal open-ended slots or notches 62 which may be considered as extending along hypothetical helices whereby a relative screw thread action of the locking member 54 may be had with respect to the cross pin 30. As seen in FIG. 1, the notches 62 of the locking member 54 are adapted to accommodate the cross pin 30 at the same time that the pin is received in the longitudinal slots 34 of the inner body 32. Due to the diagonal disposition of the notches 62, the cross pin 30 will be locked in the body 32 by the member 54 when the latter is in the indicated position and held against turning.

Figure 2:
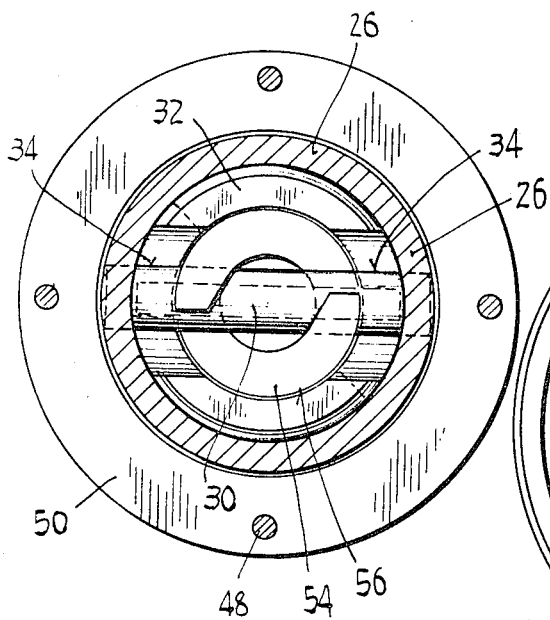
FIG. 2 is a transverse sectional view, taken on the line 2—2 of FIG. 1.
Figure 3:
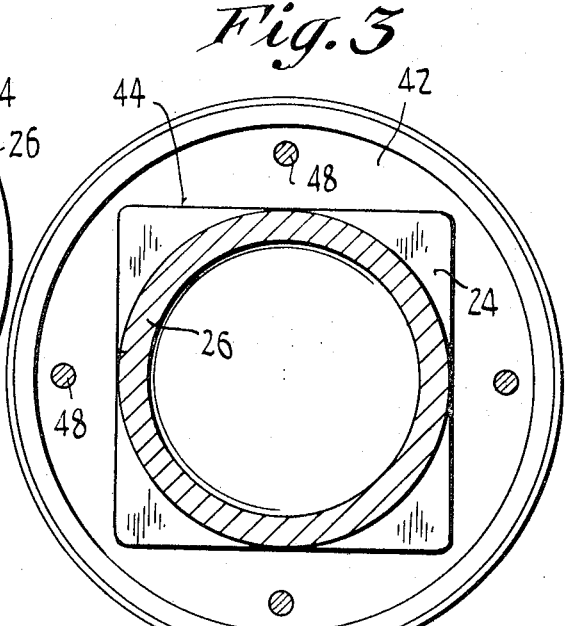
FIG. 3 is a transverse sectional view taken on the line 3—3 of FIG. 1.

However, as permitted by the slots 60 which guide the pin 58 of the locking member 54, a limited turning movement of the latter in a clockwise direction as viewed in FIG. 2 will enable the cross pin 30 to travel from left to right (considering FIG. 1) out of the slots 34 of the body member 32. This is indicated in FIGS. 13 and 14, relating to the release action of the coupling.

Accordingly it follows that if the locking member 54 is prevented from having such clockwise turning movement and is instead retained in the position illustrated in FIG. 1, the coupling will remain engaged whereby the trunnion 22 will be prevented from leaving the body 32 of the lock assembly 20.

In accordance with the present invention a unique control mechanism is provided in conjunction with the inner body 32 and the locking member 54, for controlling the movements of the latter whereby lock-up and release of the coupling parts may be easily and quickly effected, the release being accomplished by a pushing action on a release rod indicated at 68 in FIG. 1.

As seen in FIG. 8, each of the notches 62 has a forward or foremost diagonally extending edge 64 and a rearmost diagonally extending edge 66. The foremost edges 64 normally block the cross pin 30 and prevent the latter from leaving the slots 34 (shifting from left to right) when the coupling parts are secured together.

Referring to FIGS. 4 and 6, the release rod 68 is secured in an adaptor fitting 70 of a movable lock release assembly which further comprises a release ring 72 that is slidable in the bore of the inner body 32. The adaptor fitting 70 has an enlarged end portion 74 which interfits with and is secured to a connector portion 76 of the ring 72. The end portion 74 of the fitting 70 is also slidably receivable in the bore of the inner body 32, as will be understood.

The lock release assembly comprising the parts 70, 72 is held captive and prevented from turning, but is allowed to have a limited longitudinal or axial movement with respect to the inner body 32, this being effected by means of a pair of slide pins 78 which are rigidly carried by the ring 72 and which slidably fit in a pair of longitudinal slots 80 of the body 32. A helical compression spring 81 engages the head portion 56 of the locking member 54 and also the inner end of the release ring 72 whereby the lock release assembly comprising the parts 70, 72 is normally yieldably held in an outwardly shifted position (to the left as viewed in FIG. 6). It will be understood that from such outwardly shifted position, the release assembly may be pushed inward or from left to right as viewed in FIG. 6 to inward, releasing positions such as indicated in FIGS. 13 and 14.

This inward shifting of the release assembly 70, 72 is utilized to effect a release of the locking member 54 whereby the latter can turn clockwise as viewed in FIG. 2, to permit release and exit of the cross pin 30. Normally the locking member 54 is prevented from having such turning movement by a cross pin 82 passing through a shank portion 84 of reduced diameter of the locking member 54, the end portions of said cross pin being slidably accommodated in a pair of oppositely disposed notches or grooves 86 provided in the bore of the release ring 72.

It will be remembered that the release ring 72 cannot turn with respect to the inner body 32, and accordingly by virtue of the locking member 54 being keyed to the release ring 72 by the cross pin 82 as accommodated in the grooves 86, the locking member 54 is normally prevented from having turning movement. However, when in effecting release of the coupling, the release rod 68 is shifted from left to right as viewed in FIG. 1 it will similarly shift the release assembly 70, 72 whereupon the grooves 86 of the ring 72 will be disengaged from the cross pin 82 of the member 54. This is illustrated in FIG. 13 and with the locking member 54 now free to turn the cross pin 30 of the trunnion 22 can be moved from left to right in the slots 34 so as to effect release of the trunnion from the lock assembly 20. It will be noted from FIG. 13 that the cross pin 82 in the shank 84 of the locking member 54 is wholly free of the release ring 72, and that the locking member 54 has turned clockwise as viewed in FIG. 2 to the maximum extent permitted by the slots 60 which carry the pin 58. FIG. 14 illustrates the continued removing movement of the cross pin 30 of the trunnion 22.

In accordance with the invention, the releasing position of the locking member 54 as illustrated in FIGS. 13 and 14 is maintained for the purpose of enabling quick and easy lock-up of the coupling parts to be effected at a subsequent time. In accomplishing this, there is provided in the shank 84 of the locking member 54 a transverse bore 88 in which is disposed a pair of hollow, spring-charged plungers 90 normally engaging the bore of the release ring 72 and yieldably urged apart by a helical compression spring (FIG. 1) contained in their bores.

The release ring 72 has an interrupted annular groove 92 which is so positioned that portions of it can be traversed by the rounded ends of the plungers 90 at such time that the release assembly is pushed inward from left to right, as in FIG. 13. In this figure, the groove 92 is shown as positioned for such engagement by the plunger ends.

The release ring 72 also has a second pair of oppositely disposed notches or grooves 94 which are tapered and positioned to receive the rounded end portions of the plungers 90 when the locking member is in the releasing position of FIG. 14. This figure shows the locking member 54 as having been turned clockwise as viewed in FIG. 2 after its release from the ring 72 has been effected as illustrated in FIG. 13. Upon removal of the pushing force from the release rod 68, the compression spring 81 takes over, forcing the ring 72 to shift a slight extent from right to left until engagement occurs between the cross pin 82 of the member 54 and the annular groove 92 of the ring. Such engagement exists in FIG. 14, and for this position the plungers 90 will occupy the tapered grooves 94 whereby the locking member 54 is retained in the releasing position illustrated, and the release assembly 70, 72 is prevented from attaining its fully sprung out position of FIG. 1. The lock assembly 20 is thus cocked, in readiness for rejoining of the trunnion 22 to it.

*Lock-up*

From FIG. 14 it will be noted that the rearmost edges 66 of the notches 62 are in the path of movement of the cross pin 30 as the trunnion 22 is reassembled to the lock assembly 20. A camming action thus occurs as the cross pin 30 engages the edges 66, and the locking member 54 will now be forcibly turned counterclockwise as viewed in FIG. 2, causing it to resume the locking position of FIG. 1. As soon as the cross pin 82 of the locking member 54 again reaches the grooves 86 of the ring 72, the release assembly 70, 72 will be free to snap out from right to left under the action of the return spring 81, and lock-up will thus occur.

It will thus be seen from the foregoing that I have provided a novel and improved separable coupling wherein joining of the parts may be readily effected by merely pushing these together, and wherein release of the parts is effected in response to a pushing force exerted on a release member carried by one of the parts, such pushing force being in the direction toward the other or cooperable part. The coupling, by virtue of its construction, incorporates components which are sturdy and which powerfully resist deformation and failure. An advantageous means is provided for effecting the necessary orientation of the coupling parts when these are to be secured to each other, and such means also eliminate the likelihood of binding of the coupling parts whereby a positive, fast and effective release action is had.

Variations and modifications may be made within the scope of the claims, and portions of the improvement may be used without others.

I claim:
1. A releasable coupling comprising, in combination:
 (a) inner and outer relatively turnable telescoped members having cooperable jaws at one pair of juxtaposed ends for gripping and releasing a cooperable coupling part in response to relative turning of the members in one direction or the reverse, wherein the improvement comprises:
 (b) an axially movable, captive release ring keyed to one member against turning and movable thereon between locking and releasing positions, and
 (c) cooperable interfitting means on said ring and other member, coupling the latter and the ring against relative turning when the ring is in its locking position whereby the said members are immovable and the jaws are retained closed, said means discontinuing said coupling when the ring is in its releasing position whereby the members can turn and the jaws can separate from each other.
2. A releasable coupling as in claim 1, wherein:
 (a) the telescoped members have open-ended slots in their juxtaposed ends,
 (b) edge portions of said slots comprising the cooperable jaws,
 (c) some of said slots extending parallel to the axis of the members and other slots extending diagonally along hypothetical helices.
3. A releasable coupling as in claim 2, wherein:
 (a) an edge portion of a diagonal slot is adapted to cammingly engage said cooperable coupling part for relatively camming the members to effect partial relative turning thereof as the part is forced into said slots, thereby to bring the jaws in gripping relation.
4. A releasable coupling as in claim 3, wherein:
 (a) spring means are provided, biasing the release ring toward its locking position,
 (b) said cooperable interfitting means of the ring and said other member preventing the ring from being returned by said spring means to its locking position when the members are in the relatively turned positions separating the jaws,
 (c) the camming and relative partial turning of the members enabling the release ring to be returned under the action of said spring means to its locking position.
5. A releasable coupling as in claim 4, wherein:
 (a) yieldable detent means are provided, for yieldably holding the telescoped members in the relative turned positions with the jaws in releasing relation.
6. A releasable coupling as in claim 1, wherein:
 (a) said cooperable interfitting means comprises a pair of oppositely-located open-ended slots in one edge of the release ring and a pair of cooperable, oppositely-located projections carried by said other member and respectively receivable in said open-ended slots when the members are in the positions which effect a gripping of the jaws.
7. A releasable coupling as in claim 6, wherein:
 (a) spring means are provided, engaged with said other member and release ring, biasing the latter toward its locking position,
 (b) said cooperable interfitting means of the ring and said other member preventing the ring from being returned by said spring means to its locking position when the members are in the relatively turned positions separating the jaws.
8. A releasable coupling as in claim 7, wherein:
 (a) yieldable detent means are provided, for yieldably holding the telescoped members in the relatively turned positions with the jaws in releasing relation, (b) said detent means comprising a pair of oppositely-acting spring-charged yieldable plungers on said other member and a pair of oppositely disposed notches located in an edge portion of said release ring and arranged for engagement by said plungers.

9. A releasable coupling as in claim 8, wherein:

(a) said telescoped members have a pair of oppositely disposed pin-and-slot connections which prevent relative axial movement and allow a limited relative turning movement.

10. A releasable coupling as in claim 1, wherein:

(a) spring means are provided, biasing the release ring toward its locking position, (b) said cooperable interfitting means of the ring and said other member preventing the ring from being returned by said spring means to its locking position when the members are in the relatively turned positions separating the jaws.

11. A releasable coupling as in claim 10, wherein:

(a) said cooperable interfitting means comprises an open-ended slot in one edge of the release ring and a projection receivable in said slot and carried by said other member.

12. A releasable coupling as in claim 11, wherein:

(a) yieldable detent means comprising said ring are provided, for yieldably holding the telescoped members in the relatively turned positions with the jaws in releasing relation.

13. A releasable coupling as in claim 12, wherein:

(a) said detent means comprises a spring-charged plunger on said other member and a notch in said release ring, arranged for engagement by said plunger.

References Cited

UNITED STATES PATENTS

| 2,560,513 | 7/1951 | Lyon | 287—119 X |
| 3,253,310 | 5/1966 | McCarthy | 24—211 X |

BERNARD A. GELAK, *Primary Examiner.*

U.S. Cl. X.R.

24—211, 221